US006461721B1

(12) United States Patent
Krauter

(10) Patent No.: US 6,461,721 B1
(45) **Date of Patent: *Oct. 8, 2002**

(54) THERMO-TRANSFER RIBBON

(75) Inventor: Heinrich Krauter, Turriff (GB)

(73) Assignee: Pelikan Produktions AG, Egg (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,366

(22) Filed: May 6, 1999

(30) Foreign Application Priority Data

May 8, 1998 (DE) ........................................ 198 20 778

(51) Int. Cl.[7] ................................................ B32B 3/00
(52) U.S. Cl. ..................... 428/195; 428/488.1; 428/484
(58) Field of Search ................................ 428/195, 500, 428/488.1, 484, 913, 914

(56) References Cited

U.S. PATENT DOCUMENTS

| | | | | |
|---|---|---|---|---|
| 3,941,596 A | | 3/1976 | Heiart | |
| 4,592,945 A | * | 6/1986 | Mecke et al. | 428/195 |
| 4,762,734 A | | 8/1988 | Duff et al. | |
| 5,071,502 A | | 12/1991 | Hashimoto et al. | |
| 5,133,820 A | * | 7/1992 | Katayama et al. | 156/234 |

FOREIGN PATENT DOCUMENTS

| | | |
|---|---|---|
| DE | 36 13846 A1 | 11/1986 |
| EP | 0 351 794 A2 | 7/1989 |

OTHER PUBLICATIONS

Encyclopedia of Polmer Science and Engineering (2d Ed), pp. 410–411, 1985.*

* cited by examiner

*Primary Examiner*—Bruce H. Hess
*Assistant Examiner*—Michael E. Grendzynski
(74) *Attorney, Agent, or Firm*—Fay, Sharpe, Fagan, Minnich & McKee, LLP

(57) ABSTRACT

Description of a thermo-transfer ribbon having a carrier, with a thermo-transfer color (layer) formed on one side of the carrier, and, if applicable, with additional layers, whereby the thermo-transfer color contains in addition to a coloring substance, an amorphous polymer and a wax. The thermo-transfer ribbon is characterized in that the thermo-transfer color contains a polar polyethylene wax as binding agent and an amorphous polymer, which has a mol mass weight mean Mw of more than approximately 10000 and a numerical mol mass mean Mn of less than approximately 6000. It proves itself during high energy level printing of a thermo-printer as scratch- and solvent-resistant, specifically on plastic labels.

19 Claims, No Drawings

THERMO-TRANSFER RIBBON

The invention relates to a thermo-transfer ribbon with a carrier, having a thermo-transfer color on one side and with additional layers, if applicable, whereby the thermo-transfer color contains an amorphous polymer and a wax, in addition to a coloring substance.

A thermo-transfer ribbon of the above described type is known from DE 36 13 846. The thermo-transfer color of said known thermo-transfer ribbon contains an amorphous polymer, having an average molecular mass weight Mw of not more than 10000, a numerical molecular mass mean Mn of less than 5000 and a glass transformation temperature in the range from 50 to 80° C. The amorphous polymer constitutes at least 50% by weight of the thermo-transfer color in relation to its solid matter contents. This thermo-transfer ribbon provides clear color reproduction during the printing process and satisfies requirements with respect to resolution, absorption sensitivity, transmission- and fixation properties. These goals are attained in that the binding agent for the thermo-transfer color—which conventionally involves a crystalline binder on wax basis—is being replaced by an essentially amorphous, transparent polymer. In order to enhance the desired effect, a small amount of a "release agent" is bonded into the thermo-transfer color, resulting in higher image quality and, specifically, higher resolution. At the same time, excellent fixation is achieved by exploiting the polymer's intrinsic properties, i.e. its flexibility and scratch-resistance. The issue of obtaining scratch-resistant print-outs, which is one of the goals of the present invention, is not specifically addressed here.

The issue of obtaining scratch-resistant print-outs is specifically discussed in EP-B-0 380 920 and also DE 196 12 396 A1. EP-B-0 380 920 suggests for obtaining scratch-resistant print-outs that the thermo-transfer color contain, during the printing process, non-melting, coloring-substance-containing polymer pellets, which are fusible by a heat treatment following the printing process. The symbols obtained immediately after the printing process initially do not have the desired scratch resistance, which is achieved by supplying the symbols with additional heat. In doing so, a new structure develops with respect to the printed symbol. This suggestion has the drawback in that it requires a second heat treating step after the printing process itself.

DE 196 12 393 A1 provides a certain remedy. It suggests a thermo-transfer ribbon having a customary carrier with a layer of a thermo-transfer color formed on one side of the carrier, and a separation layer between the carrier and the layer of the thermo-transfer color. The separation layer is wax-bonded and contains waxes having a melting point of between approximately 70 to 110° C., including a polymer wax plasticizer with a glass temperature Tg of −30 to +70° C. In addition, the layer of the thermo-transfer color contains at least approximately 20% by weight of natural resin, modified natural resin and/or synthetic resin. This creates a thermo-transfer ribbon whose transferred thermo-transfer color, during printing, specifically during printing on paper labels, shows good adhesion as well as good rub-off resistance and scratch-resistance, and is deposited quickly and dot-accurately together with the subjacent separation- or release layer. The drawback, however, consists in that the formation of the described separation layer requires a certain expenditure, as a result of which we are dealing with a system having at least three layers.

Starting from the state of the art described in the preceding, the present invention is based on the object of further refining in such manner the initially identified thermo-transfer ribbon, so that no separation layer is needed, but obtaining, nevertheless, the benefits which are derived in relation to the description of the object of DE 196 12 393 A1.

The objective is to increase the rub-off resistance and scratch-resistance of printed symbols on labels, specifically also of printing on plastic labels, whereby, in this case, bar code labels are of particular significance. Moreover, adequate solvent-resistance shall also be provided.

According to the invention, this object is solved in that the thermo-transfer color contains, as a binding agent, a polar polyethylene wax and an amorphous polymer, which has a mol mass weight mean Mw of more than approximately 10000, and a numeric mol mass mean Mn of less than approximately 6000.

This proposed solution means that the thermo-transfer color of the thermo-transfer ribbon contains an amorphous polymer as a significant percentage of binding agent, specifically of at least approximately 50% by weight relative to the percentage of dry substance of the thermo-transfer color. When mentioning the term of "amorphous" polymer here, it shall have the meaning that from a roentgenographic aspect, its characteristic structural appearance is called amorphous.

Accordingly, the term "amorphous polymer" shall include also such oligomers and/or polymers which contain certain part-crystalline portions, for example up to approximately 30% by weight, specifically up to approximately 10% by weight. Contrary to the indicative specifications of DE 36 13 846 C2, the invention employs an amorphous polymer which has a mean mol mass weight Mw of over 10000. This comes as a surprise. The explanation that the mean mol mass weight Mw totals over 10000 is probably due to the fact that additionally, and of necessity, a polar polyethylene wax must be present. If the value falls below the Mw value of 10000, which would be in agreement with DE 36 13 846 C2, the adverse effect sets in that the adhesion of the thermo-transfer color vis-a-vis the carrier foil is too high and there is no assurance for homogenous color transfer during the printing process.

It is of particular benefit if the amorphous polymer has a mean mol mass weight Mw from 10000 to approximately 15000 and a numeric mol mass mean Mn of less than 5000, specifically approximately 2000 to 3000. The following statement can be made as a preferred quantitative basic specification relative to the ratio of polar polyethylene wax to amorphous polymer, namely that one part by weight of polar polyethylene wax corresponds to approximately 3 to 5 parts by weight, specifically approximately 4 parts by weight of amorphous polymer.

If the contents of amorphous polymer totals less than approximately 50% by weight, this may result in having a detrimental effect upon the desirable transparency of the thermo-transfer color and thus upon the capability of reproducing the color. In general, it is therefore preferred if the contents of amorphous polymer amounts to more than 50% by weight, specifically more than approximately 70% by weight, whereby, however, a ceiling value of approximately 80% by weight can be specified in order to still have available an adequate quantity of polar polyethylene wax.

It is not excluded, within the framework of the above specified basic quantity requirements, that some additional binding agents are present in small amounts in the thermo-transfer color , such as waxes customarily employed in thermo-transfer ribbons, for example paraffin wax, carnauba wax, montan wax, bees wax, vegetable wax, candelilla wax, including materials utilized as synthetic binding agents such as polyolefins having an average molecular weight of approximately 1000 to 10000, for example low-molecular weight polyethylene, polypropylene or polybutylene and similar. In some instances it may also be of advantage to include additional customary additives, which will enhance the properties of the ribbon. Within the framework of technical considerations, a person skilled in the art will hereby make the appropriate selection by which to achieve a desired effect.

Examples for utilizable amorphous polymers comprise homopolymers and co-polymers, styrol or its derivatives or substituted compounds of same (for example styrol, vinyl, toluol) acrylic acid ester, for example methyl-acrylate, ethylene-acrylate and butyl-acrylate-co-polymer, specifically polyester resins which are obtainable via polycondensation of saturated di-basic acid (for example phthalic acid, phthalic anhydride) polycarbonate, polyamide, epoxy resins, polyurethane, silicone resins, phenol resins, terpene resins, petrolic resins, hydrated petrolic resins, alkyd resins and cellulose derivatives.

Preferably employed is an amorphous polyester resin with an MFI value (105° C./2.16 kg) of approximately 1.3 to 2.3, specifically of approximately 1.5 to 2.0 g/min and a glass transformation temperature Tg of approximately 45 to 65° C., specifically approximately 52 to 56° C.

An amorphous polyester resin which satisfies these basic requirements, and which is employed in particularly beneficial fashion, is a polyester resin on the basis of bisphenol A, such as the commercial product Setafix P 120 (marketed by Akzo Noble Resins B.V., Netherlands) which is characterized by the following: MFI value (105° C./2.16 kg) of approximately 1.5 to 2.0 g/min, glass transformation temperature Tg of 52 to 56° C. and acid value from 14 to 24 mg KOH/g, Mn-value approximately 2500 and Mw value approximately 12000. A polyester resin bearing the trade name Atlac T 500 is likewise suitable (marketed by ICI Specialty Chemicals, Great Britain). This involves a linear, unsaturated polyester resin, which was originally employed for producing dry toners. The following specifications apply: MFI-value 105° C./2.16 kg, 8 to 20 g/10 min (according to ASTM D.12348-70), softening point from 94 to 106° C. (according to ASTM E 28-68), acid value from 10 to 15 mg KOH/g (ISO 2114), glass transformation temperature from 47 to 53° C. (D.S.C.), Mn-value of 3500 and Mw-value of 14000 (measured according to the GPC Method).

Another important binding agent component is the addressed polar polyethylene resin. Such waxes are obtained either by oxidation of polyethylene wax or by oxidative decomposition of synthetic-type polyethylenes. An assortment of polar, emulsive polyethylene waxes is produced from these. From among these the so-called PED Waxes by Hoechst are worth considering, and in that category the 521 and 522 types. These belong to the series of the more flexible, emulsive polyethylene waxes whose melting point permits emulsification in open vessel. A drip point of approximately 100 to 110° C., specifically of approximately 102 to 108° C. and most specifically preferred of approximately 102 to 106° C. (measured according to DIN 51 801) is regarded as preferred basic requirement with respect to the polar polyethylene waxes.

By way of additional preferred basic requirements, one might specify the following values for the polar polyethylene wax: indentation hardness according to the testing method DGF-M III-90 (57) of approximately 100 to 300 bar, a flow hardness of approximately 100 to 300 bar and a viscosity of approximately 50 to 700 mPas, specifically of approximately 100 to 500 mPas, measured according to DIN 51 550 at a temperature of approximately 120° C.

Tinting of the thermo-transfer color according to the invention can be done by any selected coloring substance. This may involve pigments, such as specifically carbon black, but it may also involve solvent- and/or binder-soluble coloring substances, such as the commercial product Basoprint, organic color pigments as well as different akzo dies (Cerces- and Sudan dies).

Carbon black is regarded as particularly suitable within the scope of the present invention. The thermo-transfer color preferably receives the coloring agent, specifically the color pigment, in a volume of approximately 20 to 40% by weight.

The viscosity of the thermo-transfer color must be sufficiently low so that the color can be deposited quickly and dot-accurately. For that reason, the thermo-transfer color preferably has a viscosity of approximately 500 to 3000 mpas, measured at 140° C. in a Brookfield-Rotationviscometer. Specifically targeted is the range from 600 to 1500 mPas.

The application thickness of the thermo-transfer color or of the color layer is not critical. Preferred is an application thickness on the carrier of approximately 1 to 5 g/m$^2$, specifically of approximately 1 to 3 g/m$^2$. Neither is the type of carrier critical. It preferably involves a foil of polyethyleneterephthalate (PET) or a capacitor tissue. Selection parameters consist of highest possible tension/elongation values and thermal stability, with thin foils, for example within a range of approximately 1 to 6 $\mu$m. PET foils are available as thin as approximately 2.5 $\mu$m, capacitor tissue as thin as approximately 6 $\mu$m.

A beneficial refinement of the inventive concept, specifically for obtaining a beneficial print, is based on the incorporation of the teaching of EP B-0 133 638. In accordance with same, a thin layer of a wax or a wax-like material is formed on the reverse side of the carrier, preferably having an application thickness of approximately 0.01 to 1 g/m$^2$, specifically of approximately 0.05 to 0.10 g/m$^2$.

Said reverse side coating material preferably consists of paraffin, silicone, natural waxes, specifically carnauba wax, bees wax, ozocerite and paraffin wax or synthetic waxes, specifically acid waxes, ester waxes, partly saponified ester waxes and polyethylene waxes, glycoles or polyglycoles and/or tensides.

With respect to the application amounts of the individual layers, one can specify the following basic requirements for the realization of the present invention:

An application is made, onto a carrier foil, specifically a carrier of polyethylene-terephthalate, having a thickness of 2 to 8 $\mu$m, specifically a thickness of approximately 4 to 5 $\mu$m, most specifically preferred in a thickness of approximately 3.5 to 4.5 $\mu$m of the following. Thermo-transfer color layer in volume of approximately 1 to 5 g/m$^2$, preferably approximately 1 to 3 g/m$^2$. Particularly preferred for the thickness of the thermo-transfer color is the range from 1.4 to 2.0 g/m$^2$, specifically approximately 1.6 to 1.8 g/m$^2$. Furthermore, if applicable, the above mentioned reverse side coating is applied to the reverse side with a thickness of approximately 0.01 to 1 g/m$^2$, specifically approximately 0.05 to 0.10 g/m$^2$. These layers can be formed in many ways using customary application processes. It can be accomplished, for example, by spraying on or by printing on a solution or dispersion, either with water or with an organic solvent, by means of application from the melt, which specifically applies with respect to the thermo-transfer layer, or even by application with a wiper-blade in form of a watery suspension with finely distributed application material therein. For application of the thermo-transfer layer, coating methods such as reverse roll- and/or gravure coating have proven themselves as specifically beneficial.

The specific invention-related benefits can be represented as follows: Surprisingly, in comparison with DE 196 12 393, the invention does not require an additional separation layer and functions on a total of two layers, whereby, beneficially, for the reasons mentioned, a reverse side is provided resulting not only in scratch-proof but also solvent-resistant print-outs on plastic labels, specifically in connection with so-called bar code labels. In contrast to the indicative specifications of DE 36 13 846 C2, the present invention employs amorphous polymers having an Mw value of over 10000. This characteristic, in combination with the polar polyethelene wax employed according to the invention, operates, in functional interaction, to the effect that the essential properties that must be required of such ribbon, are not impaired, but that the transferred thermo-transfer color has good adhesion as well as good rub-off resistance and scratch resistance, specifically on plastic labels, and that it is transferred quickly and dot-accurately.

The benefits are specifically apparent with respect to plastic labels, made for example of polyethylene, polypropylene, vinylchloride, with respect to PET foils and with respect to high-gloss papers. These favorable results are obtained at the upper energy level of the thermo-transfer printer, The employed polyethylene waxes obviously serve for providing a good release function and thus render flexible the adhesion on the printed foil. They provide, based on their excellent slide behavior, particularly beneficial scratch-resistance to the print-outs.

The invention is explained in more detail below, making use of an example:

EXAMPLE 1

A material of the following formula is applied to a customary carrier of polyethylene, having a thickness of approximately 4.5 $\mu$m, in order to form a thermo-transfer color layer:

| | Parts according to Weight |
|---|---|
| Polyester resin on basis of a bisphenol A (trade name: Setafix P 120, marketed by Akzo Nobel Resins B.V.) | 60 |
| Polar Polyethylene wax (trade name: PED 521, marketed by Hoechst AG) | 7.5 |
| Polar Polyethlene (trade name: P 522, marketed by Hoechst AG) | 7.5 |
| Carbon Black | 25 |
| Total | 100 |

The above binding agent components have the following properties:

PED 521: drip point: 105° C. (DIN 51 801), acid value: 17 mg KOH/g (DIN 53 402) saponification value: 35 mg KOH/g (DIN 53 401), density: 0.95 g/cm$^3$ at 20° C. (DIN 53 479), indentation hardness: 100–300 bar (DGF-M III-90 (57)), flow hardness: 100–300 bar and viscosity 100–500 mPas at 120° C. (DIN 51 550).

PED 522: drip point 103° C. (DIN 51 801), acid value: 25 mg KOH/g (DIN 53 402), saponification value: 55 mg KOH/g (DIN 53 401), density: 0.96 g/cm$^3$ at 20° C. (DIN 53 479), indentation hardness: 100–300 bar (DGF-M III-90 (57)), flow hardness: 100–300 bar and viscosity 100–500 mPas at 120° C. (DIN 51 550).

The above material is applied according to the reverse roll method in an approx. 20% solvent dispersion (Toluol/isopropanol: 80:20), having a thickness, when in dry condition, of approximately 1.5 $\mu$m. Evaporation of the solvent takes place by hot air passage at a temperature of approximately 100° C. When printed out at the high-energy level of a thermo-transfer printer, the obtained material turned out to be scratch- and solvent-resistant.

What is claimed is:

1. Thermo-transfer ribbon, having a carrier, with a thermo-transfer color formed on one side of the carrier, and optionally, additional layers, wherein the thermo-transfer color comprises a polar polyethylene wax binding agent and an amorphous polymer, said amorphous polymer having a mole mass weight mean Mw of more than 10,000 and a numerical mol mass mean Mn of less than 6,000.

2. Thermo-transfer ribbon according to claim 1, characterized in that the amorphous polymer has a mol mass weight mean Mw from 10000 to approximately 15000 and a numerical mol mass mean Mn of less than approximately 5000.

3. Thermo-transfer ribbon according to claim 1, characterized in that one weight part of polar polyethylene wax corresponds to approximately 3 to 5 weight parts of amorphous polymer.

4. Thermo-transfer ribbon according to claim 1, characterized in that the amorphous polymer constitutes an amorphous polyester resin.

5. Thermo-transfer ribbon according to claim 3, characterized in that the polar polyethylene wax has a drip point of approximately 100 to 110° C.

6. Thermo-transfer ribbon according to claim 5, characterized in that the drip point lies at approximately 102 to 106° C.

7. Thermo-transfer ribbon according to claim 1, characterized in that the polar polyethylene wax has an indentation hardness of approximately 100 to 300 bar, measured according to the DGF-M III-90 (57) Testing Method, a flow hardness of approximately 100 to 300 bars and a viscosity of approximately 50 to 700 mPas measured according to DIN 51 550 at a temperature of approximately 120° C.

8. Thermo-transfer ribbon according to claim 4, characterized in that the amorphous polyester resins has an MFI-value (105° C./2.16 kg) of approximately 1.3 to 2.3 and a glass transformation temperature Tg of approximately 45 to 65° C.

9. Thermo-transfer ribbon according to claim 1, characterized in that the thermo-transfer color has a thickness of approximately 1 to 5 g/m$^2$.

10. Thermo-transfer ribbon according to claim 1, characterized in that the carrier is made of polyethylene-terephthalate.

11. Thermo-transfer ribbon according to claim 1, characterized in that a layer made of a wax or a wax-like material, having a thickness of approximately 0.01 to 1 g/m$^2$ is formed on the reverse side of the carrier.

12. Thermo-transfer ribbon according to claim 1, characterized in that the amorphous polymer has a mol mass weight mean Mw from 10000 to approximately 15000 and a numerical mol mass mean Mn of between approximately 2000 to 3000.

13. Thermo-transfer ribbon according to claim 1, characterized in that one weight part of polar polyethylene wax corresponds to approximately 4 weight parts of amorphous polymer.

14. Thermo-transfer ribbon according to claim 1, characterized in that the amorphous polymer comprises bisphenol A.

15. Thermo-transfer ribbon according to claim 3, characterized in that the polar polyethylene wax has a drip point of approximately 102 to is 108° C.

16. Thermo-transfer ribbon according to claim 1, characterized in that the polar polyethylene wax has an indentation hardness of approximately 100 to 300 bar, measured according to the DGF-M III-90 (57) Testing Method, a flow hardness of approximately 100 to 300 bars and a viscosity of approximately 100 to 500 mPas measured according to DIN 51 550 at a temperature of approximately 120° C.

17. Thermo-transfer ribbon according to claim 4, characterized in that the amorphous polyester resins has an MFI-value (105° C./2.16 kg) of approximately 1.5 to 2.0 g/10 min and a glass transformation temperature Tg of approximately 52 to 56° C.

18. Thermo-transfer ribbon according to claim 1, characterized in that the thermo-transfer color has a thickness of approximately 1 to 3 g/m$^2$.

19. Thermo-transfer ribbon according to claim 1, characterized in that a layer made of a wax or a wax-like material, having a thickness of approximately 0.05 to 0.10 g/m$^2$ is formed on the reverse side of the carrier.

* * * * *